United States Patent [19]

Enegess

[11] 4,162,901
[45] Jul. 31, 1979

[54] VORTEX GAS SEPARATOR

[75] Inventor: David N. Enegess, Broad Brook, Conn.

[73] Assignee: Combustion Engineering Inc., Windsor, Conn.

[21] Appl. No.: 572,253

[22] Filed: Apr. 28, 1975

[51] Int. Cl.² ............................................. B01D 53/04
[52] U.S. Cl. ........................................... 55/17; 55/66; 55/74; 55/387; 55/459 C
[58] Field of Search ................... 55/16, 17, 52, 66, 67, 55/74, 158, 197, 204, 205, 386, 387, 459 C; 210/31 C, 198 C, 198 P, 304, 311, 512 R

[56] References Cited

U.S. PATENT DOCUMENTS

| | | | |
|---|---|---|---|
| 2,422,882 | 6/1947 | Bramley | 55/17 X |
| 3,078,647 | 2/1963 | Mosier | 55/197 |
| 3,279,153 | 10/1966 | Basmadjian et al. | 55/66 X |
| 3,344,586 | 10/1967 | Langley et al. | 55/158 |
| 3,486,306 | 12/1969 | Blackmore et al. | 55/205 |
| 3,503,712 | 3/1970 | Sussman | 55/386 X |

*Primary Examiner*—Robert H. Spitzer
*Attorney, Agent, or Firm*—Stephen L. Borst; Eldon H. Luther

[57] ABSTRACT

A vortex gas separator for the separation of a gas mixture into first and second fractions. The operation of the separator depends on the principle that various gases interact with sorbent substances to greater and lesser degrees. The gas to be separated is tangentially injected into a cylindrical container to create a vortex. The sorbent substance is suspended on the interior of the cylindrical container and interacts with the gases, slowing them down to various degrees. Accordingly, the slowest fraction migrates towards the middle and the fastest fraction is displaced to the circumference. Outlets for the slow fraction and the fast fraction are provided respectively at the axis of the container and at the periphery of the container.

23 Claims, 3 Drawing Figures

VORTEX GAS SEPARATOR

BACKGROUND OF THE INVENTION

1. Field of the Invention

This invention relates to an apparatus for effecting the separation of a gas mixture into a first fraction and a second fraction. More particularly, the invention relates to a vortex gas separator which creates a vortex on the interior of the apparatus and relies upon the selective interaction of the first and second fractions of the mixture with a sorbent material.

While the invention is applicable to any area in which the separation of a gas mixture into various components is desirable, the invention has particular utility in the treatment of the radioactive off-gases of a nuclear power plant. Therefore, the invention will be described with relation to its application in nuclear reactor systems, but the scope of the invention should not be so limited.

When uranium is fissioned in a nuclear reactor, certain fission products are formed. A fraction of the formed fission products consist of gaseous xenon and krypton. Certain isotopes of xenon and krypton are radioactive and constitute a danger if allowed to escape and to become distributed by a fluid or a gaseous medium.

Ordinarily the gaseous xenon and krypton isotopes are contained within the fuel rods of the nuclear reactor by the fuel rod cladding. However, in the event that leakage develops through the cladding, these fission product gases are released into the primary coolant. The reactor coolant disperses the dissolved fission gases throughout the primary coolant system including the auxiliary systems such as the Boric Acid Treatment System. Occasionally when a leak develops in the steam generator tubes, the primary coolant and the dissolved fission gases are leaked into the secondary coolant. With the dispersal of these radioactive fission products throughout the coolant systems, there are a number of locations from which they may leak into the atmosphere within the containment structure, the auxiliary building or the fuel handling building. Typical of these locations are the pump and valve seals which may leak during plant operation and the refueling pool which emits the dissolved fission gases during plant shutdown. Accumulation of the xenon and krypton in the containment atmosphere would eventually render it unsafe to enter into and work within the containment structure. It is, therefore, necessary to remove these fission products at least periodically from the coolant and from the various cover gases within the system. Environmental considerations, however, preclude the wanton dumping of restricted amounts of radioactive gases into the atmosphere. Temporary retention for radioactive decay, and disposal, therefore, is the most acceptable method for dealing with these gases. However, retention and disposal is complicated by the fact that the coolant off-gases contain large amounts of hydrogen and nitrogen with only small quantities of the radioactive fission product gases. Therefore, development of a method of concentrating the radioactive fission products by separation out of the hydrogen gas is desirable.

2. Description of the Prior Art

Various methods have been developed and put into use to accomplish the radioactive decay of fission products removed from the reactor coolant. One method involves the collecting and storage of the gases dissolved in the coolant for a period of time in gas decay tanks to permit the decay of the shorter half-life radionuclides. These gases are then periodically discharged to the atmosphere. The disadvantages of this system are that: (1) valuable carrier gases such as nitrogen must be stored and wastefully discharged to the atmosphere along with the radionuclides; (2) certain fission products, particularly $Kr^{85}$, have long half-lives and their discharge to the atmosphere is not desirable even though the amount of such nuclides is small and far below the maximum permissible concentration; and (3) large storage volumes and high pressures are required which increases the expense of the off-gas treatment system.

The adsorption of noble gases on charcoal at ambient temperatures is the process that has been most extensively proposed and used in BWR's. This is also a method for delaying the release of the noble gases to the atmosphere in order to allow the short-lived isotopes (primarily xenon) to decay. However, it has certain disadvantages such as: (1) large beds of charcoal are required; (2) the charcoal burns readily; and (3) less decay time is typically available than with storage systems. If the charcoal beds are refrigerated, operating costs increase and materials that would freeze or condense must be completely removed from the gas prior to its injection into the bed in order to prevent plugging of the equipment.

In cryogenic separation, another process that has been proposed for noble gas retention, the noble gases and part of the air, or other carrier gas, are first liquified. Then the noble gases are separated from the bulk gases and are concentrated by fractional distillation. As in all of the low-temperature operations, water and other gases that would form solids must be essentially completely removed prior to the treatment of the noble gases. Solids in the system cause physical difficulties, and the presence of liquid ozone, which is formed from the radiolysis of oxygen, creates an explosion hazard.

SUMMARY OF THE INVENTION

The invention involves the treatment of a gaseous mixture for its separation into a first and second fraction. In the nuclear reactor off-gas application the first fraction would desirably consist of the radioactive noble gases of zenon and krypton whereas the second fraction would consist of nitrogen and hydrogen. The off-gases withdrawn from the water coolant of a nuclear reactor are injected into a cylindrical chamber in a manner as to produce a vortex gas flow. The chamber is provided with a first fluid outlet at its center and second fluid outlet at its periphery. Internal surfaces of the chamber are coated with a substance having a greater affinity for the first fraction of the gas mixture and at lesser affinity for the second fraction of the gas mixture or vice-versa. Due to the larger affinity, the first fraction is slowed to a greater degree than the second fraction so that the first fraction migrates towards the center of the cylindrical chamber of the apparatus where it is siphoned off. The second fraction remains on the periphery of the cylindrical chamber and is also siphoned off. The radioactive fraction is, therefore, separated for its ultimate disposal, be it storage or release.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE PREFERRED EMBODIMENT

The present invention in part relies upon the well-known principles of the prior art chromatographic separators. The conventional chromatographic device consists essentially of a small diameter tube, usually about ¼ inch internal diameter, packed with a particulate inert solid which has been coated with a thin layer of nonvolatile material, which can act as a solvent for the components of the mixture to be analyzed. To operate the conventional chromatographic device a very small amount of the mixture to be analyzed is placed in the top of the packed tube called a "chromatographic column" and a stream of inert gas, usually helium, hydrogen or nitrogen is then passed through the column. The inert "carrier" gas tends to sweep the mixture down through the column and separation of the mixture components occurs. As the mixture is swept through the columns by the inert gas because of different affinities of each mixture component for the nonvolatile solvent phase. The retardation or retention time of a mixture component in such a column will vary directly with the components affinity for the solvent phase. Thus, a component that has only a small affinity for the solvent phase will be swept through the column more rapidly than a component which has considerable affinity for the solvent phase. Such separation techniques are described in the U.S. Pat. No. 3,503,712 entitled "Apparatus for Effecting Interactions of Fluids At Extended Solid Surfaces," issued on Mar. 31, 1972 to Martin D. Sussman.

Figure 1:
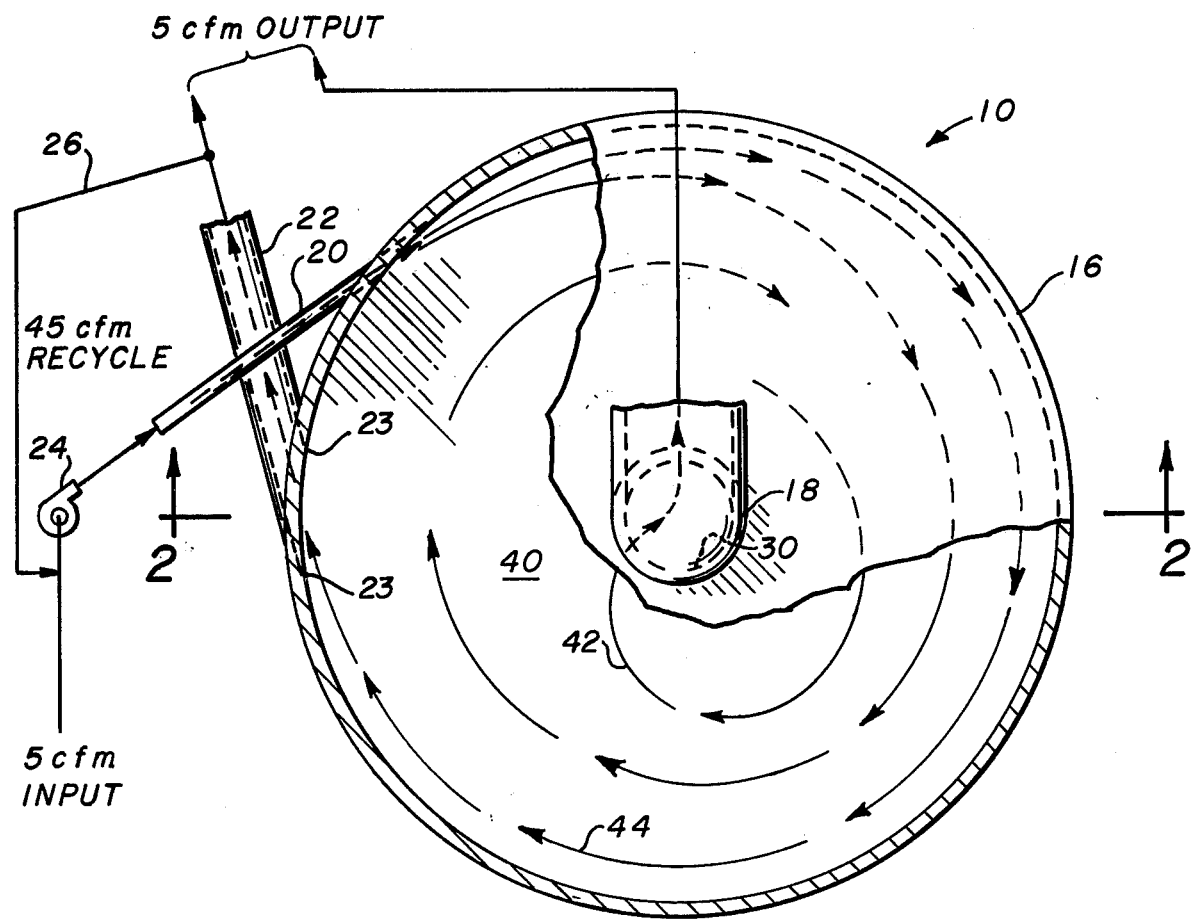
FIG. 1 is a plan view of the vortex gas separator illustrating the vortex gas flow therein.
Figure 2:
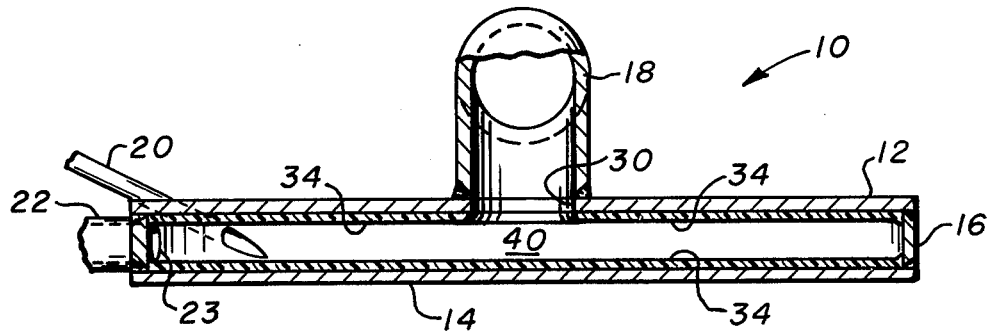
FIG. 2 is a cross-sectional representation of FIG. 1 along lines 2—2.

The method and apparatus of the present invention may be described in relation to FIGS. 1 and 2 of the drawings. FIG. 1 is a plan view of the vortex gas separator (10) of the invention which basically consists of a cylindrical chamber (40) composed of a top disc (12), a bottom disc (14) and a cylindrical sidewall (16). The top disc (12) has a hole (30) therethrough which constitutes a first fluid outlet. This fluid outlet 30 is connected to a fluid carrying duct (18) for the removal of the exiting fluid. The first fluid outlet (18) is located at the rotational axis of symmetry of the cylindrical container (10). A second fluid outlet (22) is located at the periphery of the cylindrical chamber (40). As shown in FIG. 1, the second fluid outlet (22) may intersect the cylindrical side wall (16) substantially tangentially at opening (23). The first fluid outlet (30) is provided for the removal of a first fraction of the gas mixture from the container and second fluid outlet (22) is provided for the removal of a second fraction of the gas mixture from the container.

Fluid inlet (20) is provided for injecting the gaseous mixture into the vortex gas separator (10). The fluid inlet (20) may be a nozzle which is oriented substantially normal to a radius of the chamber (40) and may be located at the periphery of the chamber (40) or at some alternative position along the radius of the chamber. In a preferred embodiment of the invention, fluid inlet (20) is at an angular position substantially equal to 360° relative to the second fluid outlet (22). With such an arrangement, the fluid inlet is spaced at a maximum angle and distance from the fluid outlet (22) thereby permitting the greatest degree of separation possible in one circuit of the gaseous mixture around the inside of the chamber (40). One desirable modification to the preferred embodiment may be the angling of the inlet nozzle (20) such that not only does the nozzle inject the gaseous mixture into the cylindrical chamber in a tangential direction but also in a direction which has a component normal to the top and bottom discs (12) and (14), respectively. This component would, therefore, be in the direction of the rotational axis of symmetry of the cylindrical container. Although the above and following description describes the apparatus in a horizontal orientation so that it is appropriate to designate the two discs as the top and bottom, it should be recognized that the invention should not be limited to a horizontal orientation and works equally well in any other orientation.

As best illustrated in FIG. 2, the interior surface of the top disc (12) or the bottom disc (14) or both are coated with a substance which is more interactive with a first fraction of the gaseous mixture than with the second fraction of the gaseous mixture. Typical coating substances and the techniques for depositing the substance in layers (34) is discussed in the above cited Sussman Patent but this invention is not limited to those substances and techniques. The substance (34) may be a layer of solvent in the gel form (such as silica gel) or may be a deposited solid. The substance or gel acts on the gas stream in the same manner as does the packing in a chromatographic column. Each fraction of the influent gas mixture has a different affinity for the gel. Accordingly, the gel will sorb each of these fractions to a different degree so that the velocity of each fraction of the mixture is decreased in proportion to its affinity for the gel. Due to the tangential injection of the gas mixture into the vortex gas separator (10) a spiral or vortex flow in the chamber (40) is created. Since the operation of the vortex gas separator requires intimate contact between the substance (34) and the injected gas mixture, it is desirable that the dimensions of the vortex gas separator (10) be such that a turbulent gas flow is created (for the particular gas mixture). In order to further assure turbulent flow in the chamber (40), the injecting nozzle (20) may be oriented to have a component in a direction normal to the discs (12) and (14) as was previously described. Gases which are slowed the most will migrate towards the center of the vortex gas separator and towards the central exit opening (30), since they do not have the velocity (and, thus, the kinetic energy) necessary to maintain their flow along the circumference of the unit. Gases which have the least affinity for the substance (34) will maintain a larger velocity and will continue to circulate around the circumference of the unit. As the first fraction of the influent mixture is slowed down, it will move in a spiral path (42) towards the center of the unit and will displace the more energetic gases outwardly. Thus, a dynamic condition is created in which the various fractions of the gas mixture move to the positions from the center which are consistent with their various kinetic energies. The "slow" fraction is removed through the first fluid outlet (30)

and by pipe (18) at the center of the upper disc (12). The "fast" fraction is removed by the second fluid outlet (22). In this manner a gaseous separation is accomplished.

Figure 3:
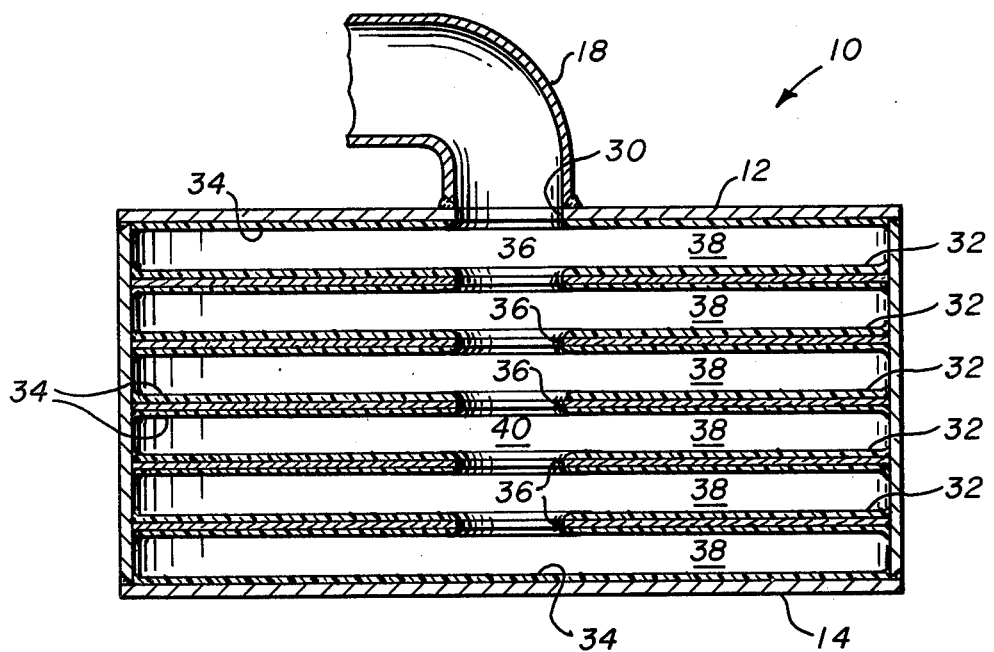
FIG. 3 is a cross-sectional view of an alternative preferred embodiment of the invention.

The dimensions of the preferred embodiment contemplated for the vortex gas separator (10), as it applies to the treatment of nuclear reactor off-gases include a vertical chamber of approximately four feet in diameter with a separation between the top and bottom discs (12) and (14) of approximately ½ inch. It should be recognized by those skilled in the art of gas separation, however, that different dimensions are possible for different applications having different requirements. For a 4 foot by ½ inch unit, and with a recycle of approximately 90 percent of the output of the "fast" fraction, the unit can handle a total flow rate of about 50 cubic feet per minute with a processing flow of approximately 5 cubic feet per minute. Such a treatment rate is sufficient to handle most nuclear reactor off-gas requirements. In certain applications, however, it is possible that a separation distance of ½ inch is insufficient to accomplish the appropriate degree of separation or to handle a larger flow rate. Accordingly, an alternative embodiment of this invention is shown in FIG. 3 in which the cylindrical chamber (40) is divided into a plurality of cylindrical compartments (38) of reduced width by a plurality of horizontal discs (32) having holes (36) through their centers. These discs (32) are suspended on the interior of chamber (40) by any appropriate means such as welding. According to this embodiment, the solvent substance is applied in coating layers (34) not only to the top and bottom discs (12) and (14) but also to the surfaces of the horizontal discs (32). This alternative embodiment may also be utilized to increase the capacity of the unit by increasing the depth of the unit from ½ inch to a greater dimension. The horizontal discs (32) are then mounted in the cylindrical chamber (40) in such a manner as to provide a separation distance of approximately ½ inch therebetween. In this embodiment the gas injecting means and the second fluid outlet may consist of a distribution header with multiple inlet nozzles and a collection header with multiple outlet nozzles respectively.

Since the contact of the processed gas with the coatings (34) is all important in the operation of the invention, variations may be developed to increase the effectiveness of the vortex gas separator by increasing the degree of contact between the gas and the coating. One possibility is the provision of radially extending baffles on the top and bottom discs (12) and (14) to induce a turbulent flow within the chamber (40). Another variation is to provide a recirculation line (26) which delivers a reflux portion of the fraction being siphoned off to the second fluid outlet (22) to a position upstream of the circulating pump (24) and the injection nozzle (20). With such an arrangement, a relatively efficient separation can be accomplished with a reflux ratio of approximately 9 to 1. In addition, another alternative is to provide a second vortex gas separator downstream of the first vortex gas separator. The second vortex gas separator would use as influent the effluent of the first vortex gas separator.

It should be recognized that one of the advantage of using the above described vortex gas separator in the nuclear reactor off-gas separation context is that the apparatus is relatively simple and may be constructed of non-corrodible materials which can be welded to make a sealed unit. This is particularly desirable inasmuch as gas separation devices which require seals for maintenance and repairs or for sealing rotation surfaces are subject to the leakage of highly radioactive gases and require a high frequency of maintenance. A high frequency of maintenance is undesirable since it exposes the maintenance personnel to heavy dosages of radiation. Additionally, nuclear reactor off-gases normally contain hydrogen and any leakage of these radioactive gases may also present an explosion hazard. The above described vortex gas separator, however, is a static device which requires no moving parts and no joints which cannot be welded shut. Accordingly, it is a device of zero maintenance and zero leakage which may be easily removed and discarded with a minimum of personnel exposure if the effectiveness of the solvent substance were to deteriorate.

What is claimed is:

1. An apparatus for effecting the separation of a gas mixture into at least a first fraction and a second fraction, wherein said apparatus comprising:
   a. a non-rotating cylindrical container having a first disc at one end and a second disc at the other end connected by a cylindrical side wall and wherein said first and second discs are substantially parallel;
   b. a first fluid outlet as the central axis of said cylindrical container;
   c. a second fluid outlet at the periphery of said cylindrical container;
   d. means for injecting said gas mixture into said cylindrical container, said means inducing a gas vortex within said cylindrical container; and
   e. a substance suspended on the interior of said cylindrical container, said substance being more interactive with said first fraction of said gas mixture than with said second fraction of said gas mixture.

2. The apparatus as recited in claim 1 wherein said gas injecting means includes a nozzle which is oriented substantially normal to a radius of said cylindrical container.

3. The apparatus as recited in claim 2 wherein the nozzle is oriented with a component in the direction of the rotational axis of symmetry of said cylindrical container.

4. The apparatus as recited in claim 2 wherein said gas injecting means is positioned at the periphery of said cylindrical container.

5. The apparatus as recited in claim 1 wherein said cylindrical container is divided into a plurality of cylindrical compartments by one or more dividing discs substantially parallel to said first and second discs, each of said dividing discs having a hole through its center.

6. The apparatus as recited in claim 1 wherein said substance suspended on the interior of said cylindrical container is a coating applied to at least one of said first and second discs.

7. The apparatus as recited in claim 5 wherein said substance suspended on the interior of said cylindrical container is a coating applied to at least one side of one of said dividing discs.

8. The apparatus as recited in claim 6 wherein said gas injecting means includes a nozzle which is oriented substantially normal to a radius of said cylindrical container.

9. The apparatus as recited in claim 8 wherein said nozzle is oriented with a component normal to said top and bottom discs.

10. The apparatus as recited in claim 6 wherein said gas injecting means is positioned at the periphery of said cylindrical container.

11. The apparatus as recited in claim 9 wherein said nozzle is positioned at the periphery of said cylindrical container.

12. The apparatus as recited in claim 7 wherein said gas injecting means includes a nozzle which is oriented substantially normal to a radius of said cylindrical container.

13. The apparatus as recited in claim 12 wherein said nozzle is positioned at the periphery of said cylindrical container.

14. The apparatus as recited in claim 1 wherein said gas injecting means has an angular position of approximately 360° relative to said second fluid outlet.

15. The apparatus as recited in claim 3 wherein said gas injecting means has an angular position of approximately 360° relative to said second fluid outlet.

16. The apparatus as recited in claim 5 wherein said gas injecting means has an angular position of approximately 360° relative to said second fluid outlet.

17. The apparatus as recited in claim 6 wherein said gas injecting means has an angular position of approximately 360° relative to said second fluid outlet.

18. The apparatus as recited in claim 1 wherein said apparatus is hermetically sealed by welding said discs to said cylindrical side wall, said gas injecting means and said second fluid outlet to said cylindrical side wall, and said first fluid outlet to one of said first and second discs.

19. The apparatus as recited in claim 5 wherein said apparatus is hermetically sealed by welding said discs to said cylindrical side wall, said gas injecting means and said second fluid outlet to said cylindrical side wall, and said first fluid outlet to one of said first and second discs.

20. The apparatus as recited in claim 4 wherein said apparatus is hermetically sealed by welding said discs to said cylindrical side wall, said gas injecting means and said second fluid outlet to said cylindrical side wall, and said first fluid outlet to one of said first and second discs.

21. The apparatus as recited in claim 15 wherein said nozzle is positioned at the periphery of said cylindrical container.

22. The apparatus as recited in claim 21 wherein said apparatus is hermetically sealed by welding said discs to said cylindrical side wall, said gas injecting means and said second fluid outlet to said cylindrical side wall, and said first fluid outlet to one of said first and second discs.

23. A method for separating a gas mixture into at least a first fraction and a second fraction, wherein said method comprising the steps of:
 (a) swirling said gas mixture in a vortex;
 (b) causing a first fraction of said gas mixture to lose more energy than a second fraction of said gas mixture by contacting said swirling gas mixture with a substance which is more interactive with said first fraction than with said second fraction;
 (c) removing a portion of said first fraction from the center of said vortex; and
 (d) removing a portion of said second fraction of said gas mixture from the periphery of said vortex.

* * * * *